W. KEARNEY.

Valves for Water-Pipes.

No. 5,220. Reissued Jan. 7, 1873.

Witnesses

F. W. B. Lovington

Wm. Drewn

Inventor

Wm. Kearney

Per Thos. L. Crane,

Attorney

AM. PHOTO-LITHOGRAPHIC CO. N.Y. (OSBORNE'S PROCESS.)

UNITED STATES PATENT OFFICE.

WILLIAM KEARNEY, OF BELLEVILLE, NEW JERSEY.

IMPROVEMENT IN VALVES FOR WATER-PIPES.

Specification forming part of Letters Patent No. 57,920, dated September 11, 1866; reissue No. 5,220, dated January 7, 1873.

*To all whom it may concern:*

Be it known that I, WILLIAM KEARNEY, of Belleville, in the county of Essex and State of New Jersey, have invented a new and Improved Valve for Water-Supply Pipes; and I do hereby declare that the following is a full, clear, and exact description thereof, which will enable those skilled in the art to make and use the same, reference being had to the accompanying drawing forming part of this specification, in which—

Figure 1:
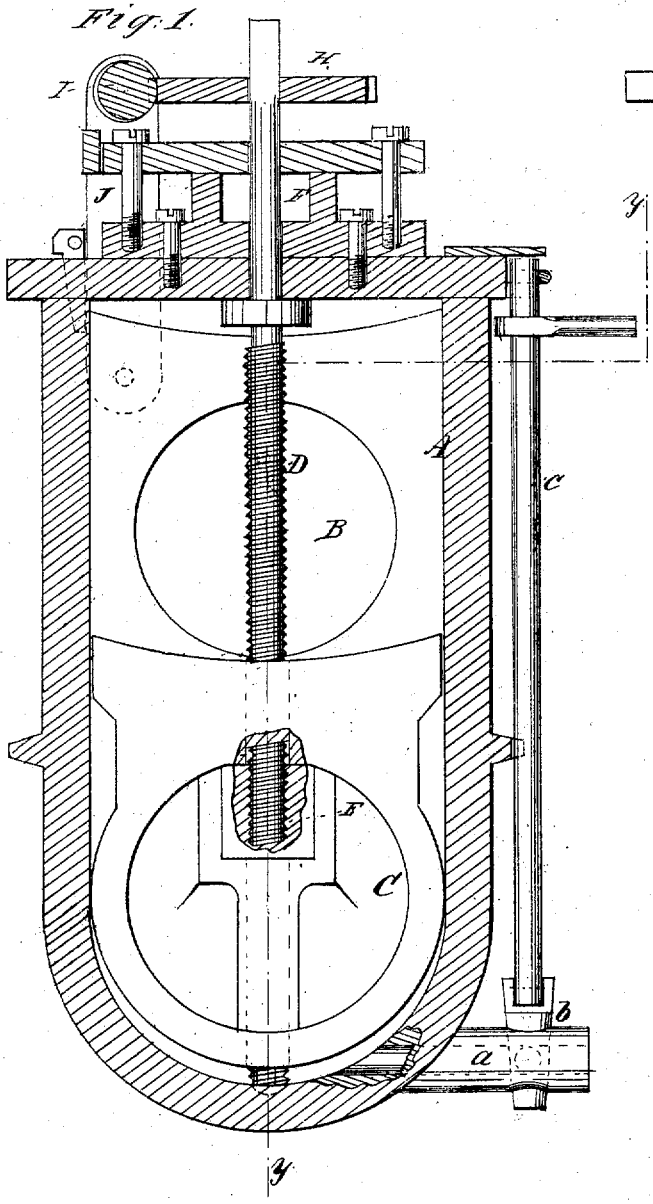
Figure 2:
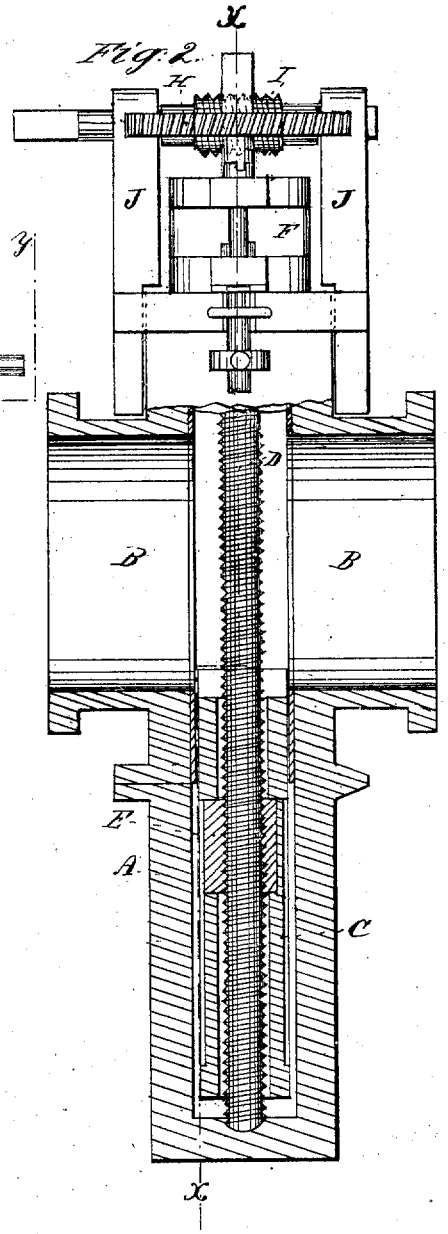

Figure 1 is a vertical section of my invention taken in the line *x x*, Fig. 2, and Fig. 2, a vertical section of the same taken in the line *y y*, Fig. 1.

Similar letters of reference indicate corresponding parts.

The object of this invention is to obtain a valve for water-supply pipes which will not be rendered inoperative by means of stones and sticks or other foreign substances interposing themselves between the valve and its seat. The invention has also for its object the ready starting of the valve under a heavy pressure of water, and a quick or rapid movement of the valve after the same has been started, and a provision made for the escape of air from the valve-chest.

A represents a box provided at each side with a tubular flange, B, to which the water-supply pipe is connected. The box is of a width corresponding internally to the width of the valve C, the lower part of which is circular as well as the lower end of the box A, (see Fig. 1,) and the box A extends down below the flanges B B sufficiently far to allow the valve to be moved down below the flanges and allow the free passage of the water through the pipe above the valve. The valve, when raised, fits snugly between the inner ends of the two flanges, and effectually stops the flow of water through the supply-pipes. The valve C is raised and lowered, opened and closed, by means of a screw, D, which passes through the top of the box A and works in a nut, E, in the valve, the upper part of the screw-rod working in a stuffing-box, F, on the box A, and having a square formed on it to receive a crank. On the upper part of the screw-rod there is fitted a worm-wheel, H, into which a screw, I, is made to gear when necessary, said screw having its bearing in bars J J, which are secured by pivot-bolts to the sides of the box to admit of the engagement of the screw I with the worm-wheel and of its disengagement therefrom.

In first starting or lowering the valve, in order to open it, the screw D is turned by applying power to the screw I, the latter being thrown in gear with the worm-wheel, and by this means the valve may be started with facility, whatever the pressure of the water in the supply-pipes may be, and after the valve is partially lowered and opened the power may be applied directly to the screw D, which will, of course, move it with greater speed, the screw I being previously thrown out from the worm-wheel H.

When the valve C is fully opened it is in the lower part of the box A, and to prevent the lower part of the box becoming filled with dirt I have a tube, *a*, inserted in the lower part of box A provided with a cock, *h*, having a rod, *c*, connected to it which extends upward to the top of A, so that the valve be opened to allow the dirt, &c., to escape, which might otherwise prevent or materially retard the passage of the valve into the lower part of the box.

This arrangement prevents sticks, stones, or other foreign substances from interposing with the closing of the valve, because the valve closes by rising or moving upward, and any obstruction resting upon it when open or down would be raised as the valve is raised and be thrown to one side under the action of the water in the pipes, and the inner surfaces of the flanges B B are provided with packing *d* to prevent substances not dissolved in the water from passing down into the box A.

Having thus described my invention, I claim as new and desire to secure by Letters Patent—

1. The combination of the box A, flanges B B, and valve C, when said parts are relatively arranged as described, and for the purpose set forth.

2. The combination of the valve C, box A, flanges B B, screw D, worm-wheel H, and screw I, all arranged to operate substantially in the manner as and for the purpose specified.

WILLIAM KEARNEY.

Witnesses:

JOHN W. DOW,

THOS. S. CRANE.